(No Model.)
J. SHACKLETON.
CONDUIT OR HOSE.
No. 374,089. Patented Nov. 29, 1887.
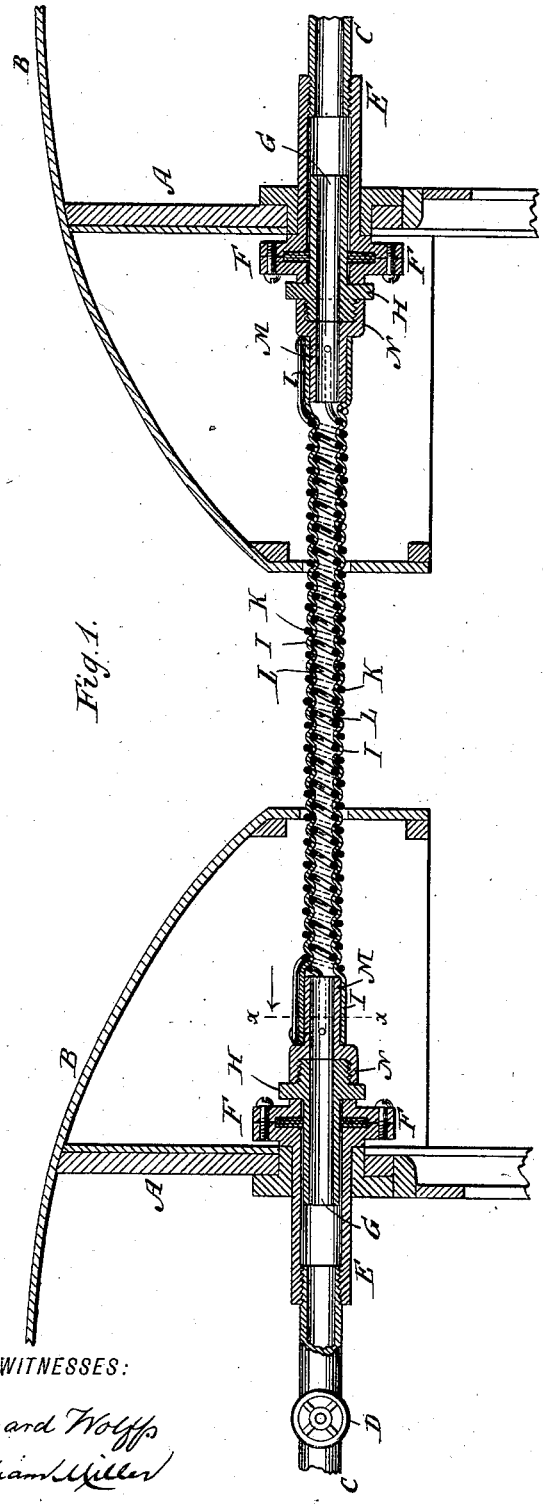
WITNESSES:
Edward Wolff
William Miller
INVENTOR
Joseph Shackleton.
BY Van Santvoord & Hauff
his ATTORNEYS

UNITED STATES PATENT OFFICE.

JOSEPH SHACKLETON, OF NEW YORK, N. Y.

CONDUIT OR HOSE.

SPECIFICATION forming part of Letters Patent No. 374,089, dated November 29, 1887.

Application filed April 5, 1887. Serial No. 233,815. (No model.)

*To all whom it may concern:*

Be it known that I, JOSEPH SHACKLETON, a citizen of the United States, residing at New York, in the county and State of New York, have invented new and useful Improvements in Conduits or Hose, of which the following is a specification.

This invention relates to improvements in conduits or hose, as set forth in the following specification and claim, and illustrated in the accompanying drawings, in which—

Figure 1 is a longitudinal sectional view of a hose or conduit. Fig. 2 is a section in the plane $x$ $x$, Fig. 1.

Similar letters indicate corresponding parts.

In the drawings the hose or conduit is shown as applied to two railroad-cars, where such hose can be used for conveying heat to such cars. Applications of the hose to other purposes can of course be made.

In the drawings, the letters A indicate the upper parts of the end walls of two cars.

B B are the car-roofs. Through the cars extend pipes or conduits C. The pipes C may be fixed to the cars at any suitable place and in any suitable manner.

To the tubes C are connected pipes E by suitable means, such as screw-threads. The pipes E are provided with stuffing-boxes F. Through the stuffing-boxes F pass pipes G. Shoulders H may be provided to limit the motion of the pipes G in the stuffing-boxes F.

To the pipes G is connected a flexible or elastic hose, I. The hose I is connected to the pipes G by suitable means, such as by slipping or clamping the ends of the hose I into engagement with the pipes G.

To prevent the hose I from sagging, said hose is provided with spiral springs K L. The spring K is applied to the hose at its exterior. The spring L is applied to the hose at its interior. The hose I is spirally corrugated, and the springs K L are seated in the spiral corrugations of the hose I. The flexible hose I is thus prevented from sagging, and consequently material such as water or other fluid is not apt to stand in the hose I. As such standing fluid may at times freeze in the hose, injury to the hose may result. By preventing sagging of the hose I no fluid can stand in the hose I when the hose is applied as shown in the drawings. The springs K L do not destroy the flexibility of the hose I, so that said hose is still free to yield to the motions of the cars. The pipes G, sliding in the stuffing-boxes F, also facilitate the yielding of the hose I to the motions of the cars.

A stop-cock, D, may be applied to close the passage through the pipes C.

In order to make the hose I readily detachable from the sliding tubes or pipes G, the hose I is shown as provided with tubes or tubular shanks M, having screws N. The screws N are shown in the form of female coupling-screws engaging screw-nipples at the ends of the sliding tubes or pipes G.

What I claim as new, and desire to secure by Letters Patent, is—

The combination of the tubes E, provided with the stuffing-boxes F, the pipes G, slidable in said tubes and stuffing-boxes and having shoulders H and screw-nipples in advance of said shoulders, the hose I, having tubular shanks M, provided with screws N, engaging the screw-nipples of the slidable pipes, and the internal and external spiral springs applied to the hose, substantially as described.

In testimony whereof I have hereunto set my hand and seal in the presence of two subscribing witnesses.

JOSEPH SHACKLETON. [L. S.]

Witnesses:
W. C. HAUFF,
A. FABER DU FAUR, Jr.